(12) United States Patent
Ball et al.

(10) Patent No.: US 7,851,095 B2
(45) Date of Patent: Dec. 14, 2010

(54) ANODE STRUCTURE

(75) Inventors: Sarah Caroline Ball, Oxon (GB); David Thompsett, Reading (GB)

(73) Assignee: Johnson Matthey Public Limited Company, London (GB)

( * ) Notice: Subject to any disclaimer, the term of this patent is extended or adjusted under 35 U.S.C. 154(b) by 399 days.

(21) Appl. No.: 11/597,773

(22) PCT Filed: May 19, 2005

(86) PCT No.: PCT/GB2005/001918

§ 371 (c)(1),
(2), (4) Date: Jun. 27, 2007

(87) PCT Pub. No.: WO2005/117172

PCT Pub. Date: Dec. 8, 2005

(65) Prior Publication Data

US 2007/0292743 A1    Dec. 20, 2007

(30) Foreign Application Priority Data

May 26, 2004    (GB) ................................. 0411733.9

(51) Int. Cl.
*H01M 4/92*    (2006.01)
*H01M 4/94*    (2006.01)
*H01M 8/06*    (2006.01)

(52) U.S. Cl. .................. 429/412; 429/485; 429/524; 429/526; 429/527; 429/534

(58) Field of Classification Search .................. 429/17, 429/19, 40, 44, 412, 485, 524, 526, 527, 429/534

See application file for complete search history.

(56) References Cited

U.S. PATENT DOCUMENTS

| 5,795,669 | A | * | 8/1998 | Wilkinson et al. ............ 429/40 |
| 5,871,860 | A | | 2/1999 | Frost et al. |
| 6,007,934 | A | | 12/1999 | Auer et al. |
| 6,040,077 | A | | 3/2000 | Debe et al. |
| 6,326,098 | B1 | | 12/2001 | Itoh et al. |

(Continued)

FOREIGN PATENT DOCUMENTS

CA    2172167    3/1995

(Continued)

OTHER PUBLICATIONS

M. Götz et al., "Binary and ternary anode catalyst formulations including the elements W, Sn and Mo for PEMFCs operated on methanol or reformate gas," *Electrochimica Acta*, 1998, vol. 43, No. 24, pp. 3637-3644.

(Continued)

*Primary Examiner*—Stephen J. Kalafut
(74) *Attorney, Agent, or Firm*—RatnerPrestia

(57) ABSTRACT

An anode structure for incorporation into a fuel cell includes a first region having one or more electrocatalysts, in which the first region is adjacent to the fuel inlet when the anode structure is incorporated into a fuel cell, and a second region having one or more electrocatalysts, in which the second region is adjacent to the fuel outlet when the anode structure is incorporated into a fuel cell. The first region is better at promoting the electrochemical oxidation of carbon monoxide than the second region.

14 Claims, 2 Drawing Sheets

U.S. PATENT DOCUMENTS

| | | | |
|---|---|---|---|
| 6,855,452 B1* | 2/2005 | Cooper et al. | 429/40 X |
| 7,176,157 B2* | 2/2007 | Ball et al. | 429/40 X |
| 2002/0122764 A1 | 9/2002 | Shore et al. | |
| 2004/0197627 A1* | 10/2004 | Yan et al. | 429/40 X |

FOREIGN PATENT DOCUMENTS

| | | |
|---|---|---|
| EP | 0 731 520 A1 | 9/1996 |
| EP | 0 736 921 A1 | 10/1996 |
| EP | 0 838 872 A2 | 4/1998 |
| EP | 0 875 524 A2 | 11/1998 |
| EP | 0 899 805 A1 | 3/1999 |
| JP | 2002-151090 | 5/2002 |
| WO | WO-00/35037 A1 | 6/2000 |
| WO | WO-01/48839 A2 | 7/2001 |
| WO | WO-02/091504 A1 | 11/2002 |
| WO | WO-02/093669 A2 | 11/2002 |
| WO | WO-03/083963 A2 | 10/2003 |
| WO | WO-2004/091004 A2 | 10/2004 |

OTHER PUBLICATIONS

B. N. Grgur et al., "Electrooxidation of $H_2$/CO Mixtures on a Well-Characterized $PT_{75}MO_{25}$ Alloy Surface," *J. Phys. Chem. B.*, 1997, vol. 101, No. 20, pp. 3910-3913.

Tseung et al., "Precious metal/hydrogen bronze anode catalysts for the oxidation of small organic molecules and impure hydrogen," *Journal of Power Sources*, vol. 61, 1996, pp. 223-225.

* cited by examiner

ANODE STRUCTURE

This application is the U.S. National Phase application of PCT International Application No. PCT/GB2005/001918, filed May 19, 2005, and claims priority of British Patent Application No. 0411733.9, filed May 26, 2004.

FIELD OF THE INVENTION

The present invention relates to an anode structure for incorporation in a fuel cell, particularly a fuel cell that is fuelled by reformate gas comprising carbon monoxide.

BACKGROUND OF THE INVENTION

A fuel cell is an electrochemical cell comprising two electrodes separated by an electrolyte. A fuel, e.g. hydrogen or methanol, is supplied to the anode and an oxidant, e.g. oxygen or air, is supplied to the cathode. Electrochemical reactions occur at the electrodes, and the chemical energy of the fuel and the oxidant is converted to electrical energy and heat. Fuel cells are a clean and efficient power source, and may replace traditional power sources such as the internal combustion engine in both stationary and automotive power applications.

In a polymer electrolyte membrane (PEM) fuel cell, the electrolyte is a solid polymer membrane which is electronically insulating but ionically-conducting. Proton-conducting membranes such as those based on perfluorosulphonic acid materials are typically used, and protons, produced at the anode, are transported across the membrane to the cathode, where they combine with oxygen to create water.

The principle component of a polymer electrolyte fuel cell is known as a membrane electrode assembly (MEA) and is essentially composed of five layers. The central layer is the polymer membrane. On either side of the membrane there is an electrocatalyst layer, typically comprising a platinum-based electrocatalyst. An electrocatalyst is a catalyst that promotes the rate of an electrochemical reaction. Finally, adjacent to each electrocatalyst layer there is a gas diffusion substrate. The gas diffusion substrate must allow the reactants to reach the electrocatalyst layer and must conduct the electric current that is generated by the electrochemical reactions. Therefore the substrate must be porous and electrically conducting.

In many practical fuel cell systems hydrogen fuel is produced by converting a hydrocarbon fuel (such as methane or gasoline) or an oxygenated hydrocarbon fuel (such as methanol) to a gas stream known as reformate in a process known as reforming. The reformate gas contains hydrogen, about 25% carbon dioxide, small amounts of carbon monoxide (typically at levels of around 1%) and may contain other contaminants. For fuel cell operating temperatures below 200° C. and especially for PEM fuel cells operating at temperatures of around 100° C., carbon monoxide, even at levels of 1-10 ppm, is a severe poison for the platinum electrocatalyst in the anodes of the MEAs. This leads to a significant reduction in fuel cell performance (i.e. the cell voltage at a given current density is reduced).

To alleviate anode carbon monoxide poisoning, most reformer systems include an additional catalytic reactor known as a preferential or selective oxidation reactor. Air or oxygen is injected into the reformate gas stream, which is then passed over a selective oxidation catalyst which oxidises the carbon monoxide to carbon dioxide. This can reduce the levels of CO from about 1% down to below 100 ppm, but even at these levels the anode electrocatalyst is poisoned.

WO 00/35037 discloses carbon monoxide tolerant anodes comprising a first electrocatalyst of formula Pt—Y, wherein Y is a bronze forming element, and a second electrocatalyst of formula Pt—M, wherein M is a metal alloyed with the platinum, wherein the first and second electrocatalysts are in ionic contact. The first and second electrocatalysts may be formulated into two separate layers, which are applied to the one side of the gas diffusion substrate or to the membrane. Alternatively, the first and second electrocatalysts may be mixed together and formed into one layer containing both catalysts. Membrane electrode assemblies comprising the anodes exhibit good performance even at levels of 100 ppm CO.

SUMMARY OF THE INVENTION

The present inventors have sought to provide anode structures that are tolerant to even higher levels of carbon monoxide and/or carbon dioxide, or that have similar carbon monoxide tolerance at lower electrocatalyst loadings.

Accordingly, the present invention provides an anode structure for incorporation into a fuel cell comprising a fuel inlet and a fuel outlet, wherein the anode structure comprises a first region comprising one or more electrocatalysts, wherein the first region will be adjacent to the fuel inlet when the anode structure is incorporated into a fuel cell, a second region comprising one or more electrocatalysts, wherein the second region will be adjacent to the fuel outlet when the anode structure is incorporated into a fuel cell, wherein the first region is better at promoting the electrochemical oxidation of carbon monoxide than the second region.

In another aspect, the present invention further provides a fuel cell having a fuel inlet and a fuel outlet, wherein the fuel cell comprises an anode structure and the anode structure comprises a first region comprising one or more electrocatalysts, wherein the first region is adjacent to the fuel inlet, a second region comprising one or more electrocatalysts, wherein the second region is adjacent to the fuel outlet, wherein the first region is better at promoting the electrochemical oxidation of carbon monoxide than the second region.

BRIEF DESCRIPTION OF THE DRAWINGS

For a more complete understanding of the invention, reference is made to the schematic drawings wherein.

DETAILED DESCRIPTION OF THE INVENTION

Figure 1:
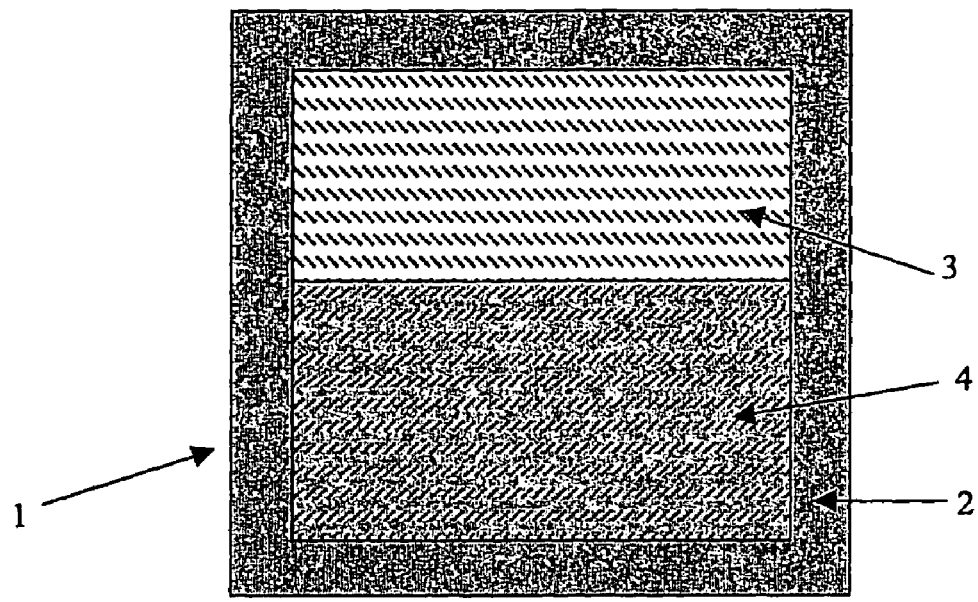
FIG. 1 is a schematic diagram showing an anode structure according to a first embodiment of the invention.

Reformate gas comprising carbon monoxide that is supplied to a fuel cell comprising the anode structure of the present invention will contact the first region of the anode structure before it reaches the second region. The electrochemical oxidation of carbon monoxide is promoted by the first region, so the gas reaching the second region will have a reduced concentration of carbon monoxide:

$$CO + H_2O \rightarrow CO_2 + 2H^+ + 2e^-$$

The electrochemical reaction is promoted by the electrocatalyst in the first region, which must be in ionic contact with the proton-conducting membrane. The electrocatalysts in the first region can be optimised for carbon monoxide removal, whilst the electrocatalysts in the second region do not need to have high tolerance to carbon monoxide. By tailoring the electrocatalysts in this manner, an overall lower loading of platinum on the anode can be achieved. Additionally, the anode structure can tolerate higher levels of carbon monoxide (up to 1000 ppm).

The term "anode structure" for the purposes of the present description means the parts of an electrochemical cell wherein the anodic electrochemical reactions take place. The physical embodiments of the "anode structure" can take several forms. The anode structure may comprise electrocatalysts applied to one face of a gas diffusion substrate. Alternatively, the anode structure may comprise electrocatalysts applied to one face of a polymer electrolyte membrane.

Suitably the first region covers between 5-50% of the surface area of the anode structure, and the second region covers the remainder of the surface area. The shape and size of the first region will be dependent on the flow field design. The incoming gas will contact the first region before contacting the second region.

Suitably the first region comprises an electrocatalyst of formula Pt—Y or Pt—Y—X, wherein Y is a bronze-forming element or oxide thereof or Y is Sn, and X is one or more metals alloyed with the platinum. Component Y may be alloyed with the Pt or the Pt—X alloy, or may be unalloyed but in physical contact with the alloy. A "bronze" material is defined by Wold and Dwight in 'Solid State Chemistry—Synthesis, Structure and Properties of Selected Oxides and Sulfides' as "an oxide with intense colour (or black), having a metallic lustre and showing either semi-conducting or metallic behaviour. A principle characteristic of bronzes is their range of composition, which results in the transition metal exhibiting a variable formal valence". Y is suitably selected from the group consisting of Sn, Ti, V, Nb, Ta, Mo, W, Re or an oxide thereof; preferably from Sn, Ti, V, Ta, Mo, W or an oxide thereof; most preferably from Sn, Mo or W or an oxide thereof. X is suitably one or more metals selected from the group consisting of Ru, Rh, Ti, Cr, Mn, Fe, Co, Ni, Cu, V, Ga, Zr and Hf and is preferably one or more of Ru, Mn, Ti, Co, Ni and Rh. A preferred electrocatalyst for the first region is Pt—Mo.

In a particular embodiment of the invention, the first region further comprises an electrocatalyst for the electrochemical oxidation of hydrogen and the electrocatalyst is preferably of formula Pt—M, wherein M is a metal alloyed with the platinum and is selected from the group consisting of Ru, Rh, Ti, Cr, Mn, Fe, Co, Ni, Cu, V, Ga, Zr and Hf.

In an alternative embodiment of the invention, the first region does not contain any electrocatalysts other than the electrocatalyst of formula Pt—Y or Pt—Y—X, wherein Y is a bronze-forming element or oxide thereof and X is one or more metals alloyed with the platinum. This is preferred because the electrocatalyst in the first region can be optimised for the oxidation of carbon monoxide.

Suitably the second region comprises an electrocatalyst for the electrochemical oxidation of hydrogen and preferably the electrocatalyst is of formula Pt—M, wherein M is a metal alloyed with the platinum and is selected from the group consisting of Ru, Rh, Ti, Cr, Mn, Fe, Co, Ni, Cu, V, Ga, Zr and Hf.

In a preferred embodiment of the invention, the first region comprises only one electrocatalyst, and the electrocatalyst is of formula Pt—Y or Pt—Y—X, wherein Y is a bronze-forming element or oxide thereof and X is one or more metals alloyed with the platinum, and the second region comprises only one electrocatalyst, and the electrocatalyst is of formula Pt—M, wherein M is a metal alloyed with the platinum and is selected from the group consisting of Ru, Rh, Ti, Cr, Mn, Fe, Co, Ni, Cu, V, Ga, Zr, Hf and Sn. In a most preferred embodiment of the invention, the first region comprises only one electrocatalyst, and the electrocatalyst is Pt—Mo, and the second region comprises only one electrocatalyst, and the electrocatalyst is Pt—Ru.

To prepare an anode structure according to the invention electrocatalysts can be deposited onto a suitable substrate using any suitable techniques known to the skilled person. The electrocatalysts may be prepared using standard techniques such as those disclosed in WO 00/35037. The electrocatalysts may be finely divided metal powders (metal blacks), or may be supported catalysts wherein small metal particles are dispersed on electrically conducting particulate carbon supports. Preferably the electrocatalysts are supported catalysts.

The substrate may be a gas diffusion. Typical gas diffusion substrates are based on carbon paper (eg Toray® paper available from Toray Industries, Japan), woven carbon cloths (eg Zoltek® PWB-3 available from Zoltek Corporation, USA) or non-woven carbon fibre webs (eg Optimat 203 available from Technical Fibre Products, UK). The carbon substrate is typically modified with a particulate material either embedded within the substrate or coated onto the planar faces, or a combination of both. The particulate material is typically a mixture of carbon black and a polymer such as polytetrafluoroethylene (PTFE).

The substrate may be a polymer electrolyte membrane. State-of-the-art membranes are often based on perfluorinated sulphonic acid materials such as Nafion® (DuPont), Flemion® (Asahi Glass) and Aciplex® (Asahi Kasei). The membrane may be a composite membrane, containing the proton-conducting material and other materials that confer properties such as mechanical strength. For example, the membrane may comprise a proton-conducting membrane and a matrix of silica fibres, as described in EP 875 524. The membrane is suitably less than 200 µm thick, preferably less than 50 µm thick.

Suitably the electrocatalysts are formulated into electrocatalyst inks, e.g. as disclosed in EP 731 520, before application to the substrate. The inks can be applied using techniques such as screen printing or spraying. To apply the inks to only the first region or only the second region, masks may be used.

The present invention further provides a membrane electrode assembly comprising an anode structure according to the invention. The person skilled in the art can prepare membrane electrode assemblies using well-known methods. Two gas diffusion electrodes (the anode being an anode structure according to the invention) can be placed either side of a membrane and laminated together to form the five-layer MEA. Alternatively, electrocatalyst layers may be applied to both faces of a membrane to form a catalyst coated membrane (CCM), such that one of the electrocatalyst layers is an anode structure according to the invention. Subsequently, gas diffusion substrates are applied to both faces of the catalyst coated membrane.

The person skilled in the art can incorporate anode structures into fuel cell structures using well-known methods.

In a further aspect the present invention provides a method of using a fuel cell according to the invention wherein reformate gas is supplied to the fuel cell.

The reformate gas stream may be formed using standard reformer apparatus and is likely to comprise hydrogen, carbon dioxide, carbon monoxide and other impurities. The concentration of carbon monoxide is suitably from 10-10,000 ppm, preferably from 20-5000 ppm. The method of the present invention can be carried out using higher concentrations of carbon monoxide than can typically be supplied to known fuel cells.

Referring now to the drawings, FIG. 1 shows an anode structure (1) wherein a first electrocatalyst region (3) and a second electrocatalyst region (4) are deposited on a gas diffusion substrate (2).

Figure 2:
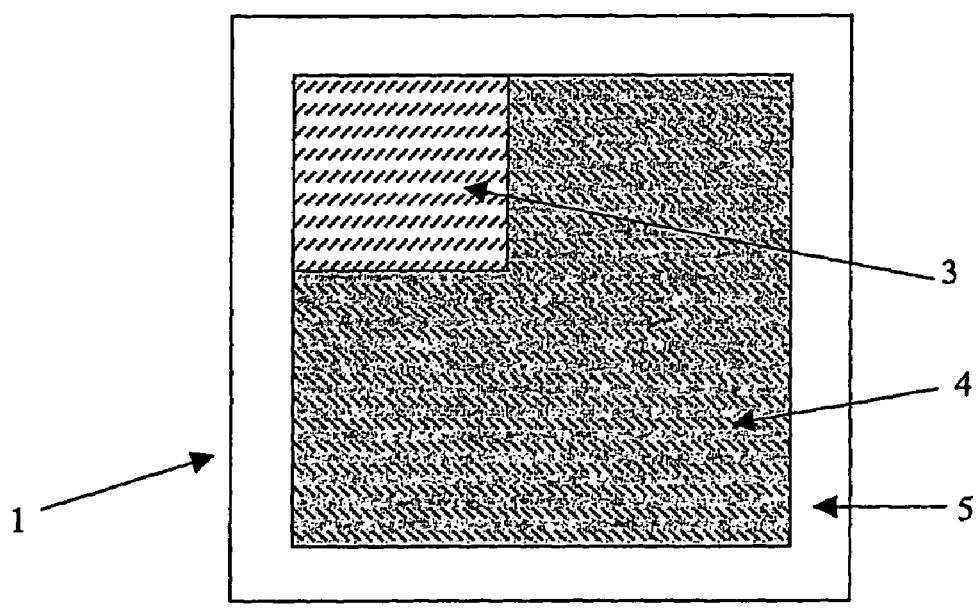
FIG. 2 is a schematic diagram showing an anode structure according to a second embodiment of the invention.

FIG. 2 shows an anode structure (1) wherein a first electrocatalyst region (3) and a second electrocatalyst region (4) are deposited on a proton-conducting membrane (5).

Figure 3:
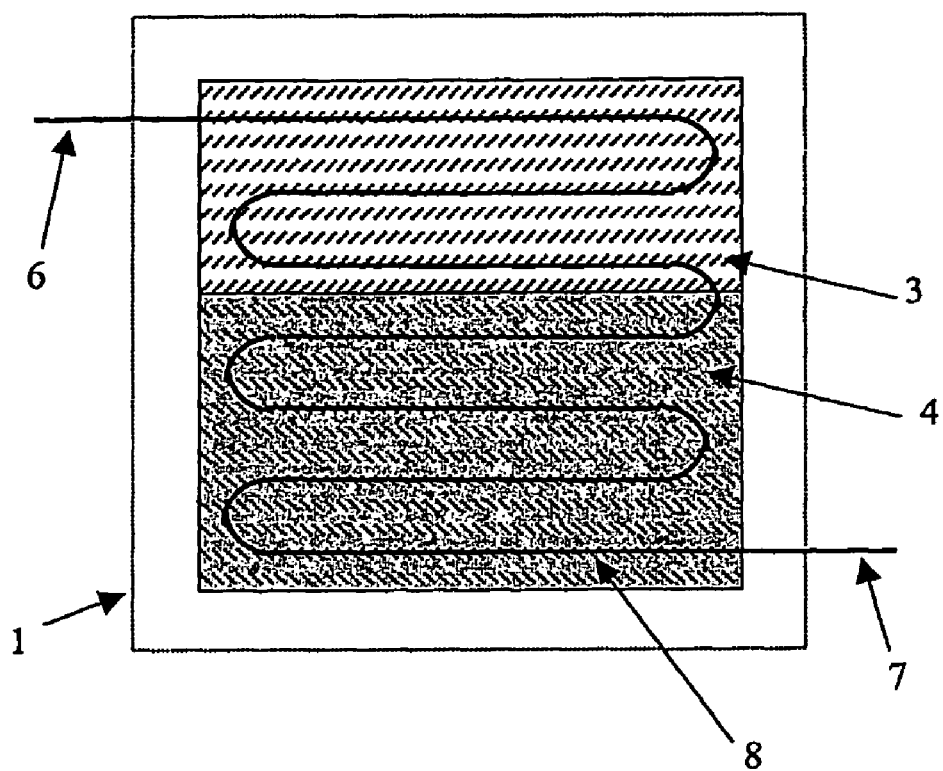
FIG. 3 is a schematic diagram showing a cross-section of a fuel cell according to an embodiment of the invention.

FIG. 3 shows a cross-section of a fuel cell wherein the edge of the anode structure (1) is shown by a dashed line. Fuel is supplied to the fuel cell through fuel inlet (6) and passes along channels in the field flow plate (8). Unreacted fuel and product gases pass through the fuel outlet (7). The fuel initially contacts the first electrocatalyst region (3) and carbon monoxide in the fuel is depleted before it reaches the second electrocatalyst region (4).

EXAMPLE

The invention will now be described by reference to the following example which is intended to be illustrative and not limiting of the invention.

Manufacture of Membrane Electrode Assemblies

Two different catalysts were used: a platinum-ruthenium on carbon black catalyst (HiSpec® 10,000 available from Johnson Matthey plc) and a platinum-molybdenum on carbon black catalyst (20 wt % Pt, 4.5 wt % Mo on Vulcan® XC72-R prepared according to the methods outlined in WO 00/35037). The catalysts were formulated into catalyst inks using the methods disclosed in EP 731 520. Four anode substrates were manufactured by screen-printing the inks onto Toray® paper covered with a carbon black/PTFE base layer:

|  | Catalyst | Platinum loading (mg Pt/cm$^2$) |
| --- | --- | --- |
| Example 1 | PtMo/PtRu | 0.34 |
| Comparative Example 1 | PtRu | 0.5 |
| Comparative Example 2 | PtRu | 0.23 |
| Comparative Example 3 | PtMo | 0.23 |

The anode substrate of Example 1 contained a region of PtMo catalyst and a region of PtRu catalyst. Each region covered 50% of the surface area of the catalysed area.

The anode substrates were combined with membranes and cathodes to form membrane electrode assemblies and were tested in a fuel cell. The membrane electrode assembly containing the example 1 substrate was positioned such that the PtMo half of the substrate was adjacent to the fuel cell inlet. The membrane electrode assemblies were tested with pure hydrogen, hydrogen containing 100 ppm carbon monoxide and hydrogen containing 25% carbon dioxide. The performance decrease in mV for each membrane electrode assembly for the carbon monoxide and carbon dioxide containing fuels (as compared to pure hydrogen) was calculated:

|  | Performance loss due to 100 ppm CO (mV) | Performance loss due to 25% CO$_2$ (mV) |
| --- | --- | --- |
| Example 1 | 78 | 30 |
| Comparative Example 1 | 77 | 19 |
| Comparative Example 2 | 126 | 22 |
| Comparative Example 3 | 52 | 45 |

The anode substrate according to the invention (example 1) provides comparable carbon monoxide tolerance to a PtRu catalysed substrate with substantially higher platinum loading (comparative example 1). The anode substrate according to the invention provides better carbon dioxide tolerance than a PtMo catalysed substrate (comparative example 3).

The invention claimed is:

1. An anode structure for incorporation into a fuel cell comprising a fuel inlet and a fuel outlet, wherein the anode structure comprises:

a first region comprising an electrocatalyst of formula Pt—Y or Pt—Y—X, wherein Y is selected from the group consisting of Sn, Ti, V, Ta, Mo, W, Re or an oxide thereof, and X is one or more metals alloyed with the platinum, wherein the first region will be adjacent to the fuel inlet when the anode structure is incorporated into a fuel cell and wherein the first region covers between 5-50% of the surface area of the anode structure; and a second region comprising an electrocatalyst of formula Pt—M for the electrochemical oxidation of hydrogen, wherein M is a metal alloyed with the platinum and is selected from the group consisting of Ru, Rh, Cr, Mn, Fe, Co, Ni, Cu, Ga, Zr and Hf, wherein the second region will be adjacent to the fuel outlet when the anode structure is incorporated into a fuel cell;

wherein the second region covers only that portion of the surface area of the anode structure not covered by the first region, the first region does not comprise the electrocatalyst of the second region, and the second region does not comprise the electrocatalyst of the first region; and wherein the first region is better at promoting the electrochemical oxidation of carbon monoxide than the second region.

2. An anode structure according to claim 1, wherein Y is selected from the group consisting of Sn, Ti, V, Ta, Mo, W and oxides thereof.

3. An anode structure according to claim 1, wherein X is one or more metals selected from the group consisting of Ru, Rh, Ti, Cr, Mn, Fe, Co, Ni, Cu, V, Ga, Zr and Hf.

4. An anode structure according to claim 1, wherein the first region comprises a Pt—Mo electrocatalyst.

5. An anode structure according to claim 1, wherein the first region comprises only one electrocatalyst and the second region comprises only one electrocatalyst.

6. An anode structure according to claim 5, wherein the first region comprises only one electrocatalyst, and the electrocatalyst is Pt—Mo, and the second region comprises only one electrocatalyst, and the electrocatalyst is Pt—Ru.

7. An anode structure according to claim 1, comprising electrocatalysts on the surface of a gas diffusion substrate.

8. An anode structure according to claim 1, comprising electrocatalysts on the surface of a polymer membrane.

9. A membrane electrode assembly comprising an anode structure according to claim 1.

10. A fuel cell having a fuel inlet and a fuel outlet, wherein the fuel cell comprises an anode structure and the anode structure comprises a first region comprising an electrocatalyst of formula Pt—Y or Pt—Y—X, wherein Y is selected from the group consisting of Sn, Ti, V, Ta, Mo, W, Re or an oxide thereof, and X is one or more metals alloyed with the platinum, wherein the first region is adjacent to the fuel inlet and wherein the first region covers between 5-50% of the surface area of the anode structure; and a second region comprising an electrocatalyst of formula Pt—M for the electrochemical oxidation of hydrogen, wherein M is a metal alloyed with the platinum and is selected from the group consisting of Ru, Rh, Cr, Mn, Fe, Co, Ni, Cu, Ga, Zr and Hf, wherein the second region is adjacent to the fuel outlet, wherein the second region covers the remainder of the surface area of the anode structure not covered by the first region;

wherein the second region covers only that portion of the surface area of the anode structure not covered by the first region, the first region does not comprise the electrocatalyst of the second region, and the second region does not comprise the electrocatalyst of the first region; and wherein the first region is better at promoting the electrochemical oxidation of carbon monoxide than the second region.

11. A method of using a fuel cell comprising the step of supplying a fuel cell according to claim 10 with reformate gas.

12. An anode structure according to claim 5, comprising electrocatalysts on the surface of a gas diffusion substrate.

13. An anode structure according to claim 5, comprising electrocatalysts on the surface of a polymer membrane.

14. A membrane electrode assembly comprising an anode structure according to claim 5.

* * * * *